United States Patent [19]
Gajewski et al.

[11] Patent Number: 6,027,769
[45] Date of Patent: Feb. 22, 2000

[54] METHOD FOR PRODUCING CYLINDRICAL OBJECTS OF MULTILAYER DISSIMILAR COMPOSITIONS WITHOUT INTERFACES

[76] Inventors: Vincent J. Gajewski, 44 Guinevere Ridge, Cheshire, Conn. 06410; Ronald W. Fuest, 12 Dinglebrook La., Newtown, Conn. 06470

[21] Appl. No.: 09/138,752

[22] Filed: Aug. 24, 1998

[51] Int. Cl.$^7$ .............................. B05D 1/34; B05D 1/36; B05D 3/12
[52] U.S. Cl. ...................... 427/425; 427/177; 427/407.1; 427/346; 427/426
[58] Field of Search ...................................... 427/426, 425, 427/422, 421, 407.1, 409, 177, 178, 346, 420

[56] References Cited

U.S. PATENT DOCUMENTS

| | | | |
|---|---|---|---|
| 3,009,209 | 11/1961 | Weinbrenner et al. . | |
| 3,520,747 | 7/1970 | McGaughey | 156/153 |
| 3,646,651 | 3/1972 | McGaughey et al. | 29/130 |
| 4,368,568 | 1/1983 | Watanabe | 29/130 |
| 4,368,788 | 1/1983 | Drake | 175/374 |
| 4,542,070 | 9/1985 | Ohtani et al. | 427/410 |
| 4,571,798 | 2/1986 | Adams | 29/121.8 |
| 4,835,022 | 5/1989 | Huhne | 427/423 |
| 4,955,899 | 9/1990 | Della Corna et al. | 623/1 |
| 5,178,902 | 1/1993 | Wong et al. | 427/426 |
| 5,370,831 | 12/1994 | Blair et al. | 427/470 |
| 5,522,003 | 5/1996 | Ward et al. | 385/123 |
| 5,537,729 | 7/1996 | Kolobow | 29/527.2 |
| 5,618,325 | 4/1997 | Baniel | 65/380 |
| 5,792,518 | 8/1998 | Gibson et al. | 427/443.2 |
| 5,895,689 | 4/1999 | Gajewski | 427/426 |

OTHER PUBLICATIONS

Ruprecht et al., Polyurethane World Congress 1991 (Sep. 24–26, 1991) 478–481.

*Primary Examiner*—Diana Dudash
*Attorney, Agent, or Firm*—Raymond D. Thompson; Paul Grandinetti

[57] ABSTRACT

A method for depositing at least two components having dissimilar compositions on a cylindrical surface is disclosed wherein the method comprises the steps of:

(a) rotating the cylindrical surface about its axis;
(b) locating a mixing head a short distance from the cylindrical surface, said mixing head being connected to separate supply means for each of said components via flow controlling means;
(c) opening a first flow controlling means thereby supplying a first component to the mixing head;
(d) moving the mixing head in the axial direction along the cylindrical surface while depositing the first component from the mixing head onto the cylindrical surface;
(e) opening a second flow controlling means to the extent necessary to supply a second component to the mixing head at a flow rate lower than that at which the first component is supplied;
(f) gradually decreasing the flow rate of the first component while gradually increasing the flow rate of the second component until the flow of the first component is terminated and a predetermined quantity of the second component has been deposited on the cylindrical surface;

whereby the cylindrical surface is coated with layers of the first component and the second component and, between them, a gradient of the two components and no interface.

30 Claims, No Drawings

METHOD FOR PRODUCING CYLINDRICAL OBJECTS OF MULTILAYER DISSIMILAR COMPOSITIONS WITHOUT INTERFACES

BACKGROUND OF THE INVENTION

1. Field of the Invention

The present invention relates to a method for coating cylindrical rolls. More particularly, the present invention relates to the coating of rolls with layers of two or more coating materials wherein there is no interface between the layers.

2. Description of Related Art

A variety of elastomeric coverings are used to coat rolls in applications in which such rolls require protection. Polyurethane elastomers are used as roll coatings in applications where abrasion and tear resistance, good load bearing characteristics, high hardness, and solvent resistance are required.

In steel mill applications, for example, large numbers of these rolls are used for guiding, tensioning, and otherwise engaging steel strip during rolling and pickling operations. The rolls are subjected to the strong chemical agents used for pickling and cleaning the strip. Similarly, in paper mills, polyurethane coated metal rolls are used for supporting and conveying paper through high pressure nips or paper making machine assemblies, such as, press rolls, calender stacks, and the like. The rolls used in paper mill operations require a protective cover whose thickness can be varied depending on the roll's anticipated use.

Different methods have been developed for applying coatings to metal rolls.

U.S. Pat. No. 3,520,747 discloses a process for making a structural member for use in hydrofluoric and other corrosive environments, said structural member including a base structure. The process includes the steps of roughening the base structure, applying a coating to the roughened surface of a resin selected from the group consisting of polyester, phenolic and epoxy resins, depositing a layer of glass fiber material on the resin, coating an additional quantity of the resin on the fiber glass material, which is worked into the interstices of the fiber glass material to impregnate it as well as to leave a coating of the resin material thereover, applying a layer of fibrous material selected from the group consisting of crocidilite, asbestos, and fibrous polyvinyl chloride-acrylonitrile copolymer to the second-mentioned resin coating, applying a third quantity of the resin to the surface of the fibrous material and working it into the interstices of the fibrous material to impregnate it and to leave a coating of the resin thereover.

U.S. Pat. No. 3,646,651 discloses structural materials, especially rolls for use in steel-fabricating processes, for use in corrosive and erosive environments. In one arrangement, the roll includes a base member or substrate to which is adhered a resin coating. A reinforcing mat or cloth is adhered to and partially embedded in the resin coating, before the latter hardens. A second resin layer is coated upon and partially impregnates the reinforcing mat. A second mat is then adhered to the second resin layer in a similar manner followed by a third coating of the resin material. A greater or lesser number of resin layers and reinforcing mats can be employed as required. The specific materials employed for the resin or plastic layers and the reinforcing cloths or mats can be varied according to the specific environment in which the roll will be used. For example, in the presence of hydrofluoric acid the reinforcing mat may be Dynel cloth. For resilient contact with the work a suitable elastomeric layer is placed over the last resin or plastic coating.

U.S. Pat. No. 4,368,568 discloses a polyurethane covered roll comprising a metallic roll core, a reinforcing layer adhering to the outer surface of the roll core, and formed by a nonwoven fabric impregnated with a mixture of a thermosetting resin and a fine inorganic powder, and a layer of polyurethane rubber united integrally with the outer surface of the reinforcing layer. The roll is said to be useful when used, for example, in a paper machine.

U.S. Pat. No. 4,571,798 discloses a urethane covered metal press roll provided by spray coating the roll body with a quick jelling resin formulation creating isolated small pores giving the cover a stone-like texture. The coating is applied to a desired depth by successive passes of a spray jet over the rotating roll body. The resin quickly jells and after being cured, the cover is ground to a desired diameter and finish.

Ruprecht et al., *Polyurethane World Congress* 1991 (Sep. 24–26, 1991) 478–481, describe rotational casting techniques useful for producing roll coverings using fast-reacting polyurethane elastomer systems. In these systems, the polyurethane reaction mixture is metered through a movable mixing head that travels at constant speed in the axial direction along the rotating roll core, a short distance above its surface. The polyurethane reaction mixture solidifies very quickly, in a matter of seconds, to produce a polyurethane coating with a thickness buildup of 4 to 5 mm. Additional layers of the polyurethane reaction mixture are applied until the desired thickness of polyurethane coating is achieved. The interval between applications is kept under 30 minutes in order to ensure good adhesion of one layer to another. After a short curing time at ambient temperature the covering is machined to the desired final thickness. The cold-curing two-component system consists of a highly reactive polyol blend and a prepolymer based on MDI yielding elastomers in a hardness range of 73 to 95 Shore A with good mechanical properties and chemical resistance. It is reported that rotational casting offers a number of advantages over conventional methods. No mould and no release agent is needed. The whole operation takes place at room temperature. Layers of different hardness and other physical properties can be combined in one covering. The overall production time is very short. Rolls and other rotationally symmetrical objects with a large difference in size and shape can be covered by one piece of equipment. Rolls with coverings made by rotational casting are successfully used in the steel industry, above all in sheet metal finishing, e.g., as backup, deflection, and squeeze rolls. Further applications include various types of rolls in paper machines and conveyer belt rolls.

The disclosures of the above-described references are incorporated herein by reference in their entirety.

SUMMARY OF THE INVENTION

The present invention is directed to a method for producing cylindrical objects having multilayers of dissimilar compositions deposited thereon without having interfaces therebetween.

When two or more dissimilar materials are applied to a substrate, there is typically an interface between one such material and another. This interface is a weak point in the bonding of the layers. It has now been found that, by using multicomponent equipment having variable throughputs, a first material can be applied to a cylindrical object, e.g., a roller, via rotational casting and then subsequent layers of continually varying mixtures of the first material and a second material can be applied, with each subsequent layer becoming more concentrated in the second material and less concentrated in the first material. Finally, a layer or layers of the second material is applied, yielding a multilayered coating having no interface between the layers. Those skilled in the art will readily comprehend that, although the invention has been illustrated above in an embodiment in which two dissimilar layers are coated on the substrate, it is not so limited and, using the same principle, three or more layers could, in the same fashion, be applied.

More particularly, the present invention is directed to a method for depositing at least two components having dissimilar compositions on a cylindrical surface comprising the steps of:

A. rotating the cylindrical surface about its axis;

B. locating a mixing head a short distance from the cylindrical surface, said mixing head being connected to separate supply means for each of said components via flow controlling means;

C. opening a first flow controlling means thereby supplying a first component to the mixing head;

D. moving the mixing head in the axial direction along the cylindrical surface while depositing the first component from the mixing head onto the cylindrical surface;

E. opening a second flow controlling means to the extent necessary to supply a second component to the mixing head at a flow rate lower than that at which the first component is supplied;

F. gradually decreasing the flow rate of the first component while gradually increasing the flow rate of the second component until the flow of the first component is terminated and a predetermined quantity of the second component has been deposited on the cylindrical surface;

whereby the cylindrical surface is coated with layers of the first component and the second component and, between them, a gradient of the two components and no interface.

DESCRIPTION OF THE PREFERRED EMBODIMENTS

As stated above, the present invention is directed to a method for depositing at least two components having dissimilar compositions on a cylindrical surface comprising the steps of:

A. rotating the cylindrical surface about its axis;

B. locating a mixing head a short distance from the cylindrical surface, said mixing head being connected to separate supply means for each of said components via flow controlling means;

C. opening a first flow controlling means thereby supplying a first component to the mixing head;

D. moving the mixing head in the axial direction along the cylindrical surface while depositing the first component from the mixing head onto the cylindrical surface;

E. opening a second flow controlling means to the extent necessary to supply a second component to the mixing head at a flow rate lower than that at which the first component is supplied;

F. gradually decreasing the flow rate of the first component while gradually increasing the flow rate of the second component until the flow of the first component is terminated and a predetermined quantity of the second component has been deposited on the cylindrical surface;

whereby the cylindrical surface is coated with layers of the first component and the second component and, between them, a gradient of the two components and no interface.

The components that are deposited on the cylindrical surface are normally polymeric. Among the polymers that can be used may be listed elastomers, such as, neoprene, polyurethane rubber, silicone rubber, polychloroprene rubber, chlorosulfonated polyethylene, butyl rubber, acrylonitrile-butadiene rubber, styrene-butadiene rubber, ethylene-propylene-cyclopentadiene copolymer, natural rubber; polyester resins; phenolic resins; epoxy resin; vinyl polymers and copolymers, acrylic polymers and copolymers; and the like.

Although the components that are coated according to the invention are "dissimilar," such dissimilarity need not necessarily be in chemical species. That is to say, for example, a 90:10 copolymer of styrene and butadiene is considered, for purposes of the present invention, to be dissimilar to a 10:90 copolymer of styrene and butadiene.

Polyurethanes of varying compositions are especially preferred for use in the practice of the present invention. As those skilled in the art are aware, polyurethanes are often prepared at the time of, or shortly before, their intended use. Thus, a given supply means for such a polyurethane may, itself, be a mixing head for the chemical species necessary for the formation of the polymer, coming to it from two or more upstream supply means.

The polyurethane described in U.S. Pat. No. 5,895,808, is particularly preferred as at least one of the components employed in the practice of the present invention. This polyurethane composition comprises (a) an isocyanate-terminated polyurethane prepolymer and (b) a curative agent comprising (i) a polyol; (ii) an aromatic diamine; (iii) a thixotropic aliphatic amine; and (iv) a thixopropic colloidal additive.

The term "isocyanate-terminated polyurethane prepolymer" is defined as the reaction product formed when an excess of an organic diisocyanate monomer is reacted with a polyol. Preferably, a stoichiometric excess of the diisocyanate monomer (an NCO:OH ratio greater than 2:1) is used.

The term "thixotropic" is defined as a material whose addition to a polyurethane composition results in a composition whose viscosity lowers under shear and whose viscosity rises (thickens) in the absence of shear.

The diisocyanate monomer can be an aromatic or aliphatic diisocyanate. Useful aromatic diisocyanates can include, for example, 2,4-toluene diisocyanate and 2,6-toluene diisocyanate (each generally referred to as TDI), mixtures of the two TDI isomers, 4,4'-diisocyanato diphenylmethane(MDI), p-phenylenediisocyanate (PPDI), naphthalene-1,5-diisocyanate, diphenyl-4,4'-diisocyanate, dibenzyl-4,4'-diisocyanate, stilbene-4,4'-diisocyanate, benzophenone-4,4'-diisocyanate, 1,3- and 1,4-xylene diisocyanates, and mixtures thereof. Preferred aromatic isocyanates for preparation of polyurethanes useful in the practice of the present invention include TDI, MDI, and PPDI.

Useful aliphatic diisocyanates can include, for example, 1,6-hexamethylene diisocyanate, 1,4-cyclohexyl diisocyanate (CHDI), the saturated diphenylmethane diisocyanate (known as H(12)MDI), isophorone diisocyanate (IPDI), and the like. A preferred aliphatic diisocyanate is CHDI.

High molecular weight (MW) polyols useful in the preparation of the isocyanate-terminated polyurethane prepolymer have a number average molecular weight of at least about 250, e.g., polyether polyols or polyester polyols. The molecular weight of the polyol can be as high as, e.g., about 10,000 or as low as about 250. A molecular weight of about 650 to 4000 is preferred, with a molecular weight of 1000 being the most preferred.

A preferred high MW polyol is a polyalkyleneether polyol having the general formula $HO(RO)_nH$, wherein R is an alkylene radical and n is an integer large enough that the polyether polyol has a number average molecular weight of at least 250. Such polyalkyleneether polyols are well-known and can be prepared by the polymerization of cyclic ethers such as alkylene oxides and glycols, dihydroxyethers, and the like, using methods known in the art.

Another preferred high MW polyol is a polyester polyol. Polyester polyols can be prepared by reacting dibasic acids (usually adipic acid, but other components such as sebacic or phthalic acid may be present) with diols such as ethylene glycol, 1,2-propylene glycol, 1,4-butylene glycol, diethylene glycol, tetramethylene ether glycol, and the like. Polyols such as glycerol, trimethylol propane, pentaerythritol, sorbitol, and like can be used if chain branching or ultimate cross-linking is desired. Some polyester polyols also employ caprolactone and dimerized unsaturated fatty acids in their manufacture. Another useful polyester polyol can be obtained by the addition polymerization of e-caprolactone in the present of an initiator.

Other useful high MW polyols are those that have at least two hydroxyl groups and whose basic backbone is obtained by polymerization or copolymerization of such monomers as ethylene, butylene, butadiene and isoprene monomers.

The high molecular weight polyols can be used in combination with low MW polyols, i.e., polyols with an average molecular weight of less than 250. An aliphatic glycol is a preferred low MW polyol. Suitable aliphatic polyols include ethylene glycol, diethylene glycol, dipropylene glycol, neopentyl glycol, 1,3-butanediol, and the like. In general, the amount of the low MW polyol should be no more than about 20 percent of the combination of high MW polyol and low MW polyol. Preferably, the amount of low MW polyol is between about 0 to about 15 percent of the combination.

Particularly preferred polyols useful in the preparation of the isocyanate-terminated polyurethane prepolymer of the invention include polytetramethylene ether glycol (PTMEG), polypropylene glycol, polyethylene butylene diol and a dihydroxypolyester.

The isocyanate-terminated polyurethane prepolymer can be prepared by reacting the organic diisocyanate monomer with the polyol or polyol blend, in a mole ratio of organic diisocyanate monomer to polyol or polyol blend ranging from about 1.7:1 to about 12:1, depending on the diisocyanate monomer being used. For example, when the diisocyanate monomer is TDI, the preferred mole ratio of organic diisocyanate monomer to polyol is from about 1.7:1 to about 2.2:1. When the diisocyanate monomer is MDI, the preferred mole ratio of organic diisocyanate monomer to polyol is from about 2.5:1 to about 4:1.

The preferred curative agent comprises: (i) a polyol; (ii) an aromatic diamine; (iii) a thixotropic amine, preferably, a thixotropic aliphatic amine; and (iv) a thixotropic colloidal additive.

The polyol useful in the curative agent can be any of those described above and can be the same or different from the polyol used in the preparation of the isocyanate-terminated polyurethane prepolymer. Preferred polyols for use in the curative agent include polytetramethylene ether glycol (PTMEG), polyethylene abutylene diol, polypropylene glycol, and a dihydroxypolyester. The polyol can be used in an amount from about 10 weight percent to about 90 weight percent of the total weight of the curative agent. A preferred amount of polyol will range from about 30 to about 60 weight percent of the total weight of the curative agent.

The aromatic diamine useful in the curative agent can be any aromatic diamine useful as a curative for polyurethane, such as, for example, 4,4'-methylenebis-(2-chloroaniline), 2,2',5-trichloro-4,4'-methylenediamine, naphthalene-1,5-diamine, ortho, meta, and para-phenylene diamines, toluene-2,4-diamine, dichlorobenzidine, diphenylether-4,4'-diamine, including their derivatives and mixtures. Preferred aromatic diamines include 4,4'-methylene-bis-(3-chloro)aniline (MBCA), 4,4'-methylene-bis-(3-chloro-2,6-diethyl)aniline (MCDEA), diethyl toluene diamine (DETDA), t-butyl toluene diamine (TBTDA), dimethylthio-toluene diamine (Ethacure™ 300 from Ethyl Corporation), trimethylene glycol di-p-aminobenzoate (Polacure™ 740 from Polaroid Corporation), and 1,2-bis(2-aminophenylthio)ethane (Cyanacure™ from American Cyanamide Company). Especially preferred aromatic diamines include Ethacure 300 and similar compounds. The aromatic amine is present in the curative agent in an amount ranging from about 10 weight percent to about 90 weight percent of the total weight of the curative agent. A more preferred range is from about 20 to about 80 weight percent.

The thixotropic amine can be any amine, preferably an aliphatic amine, that reacts quickly with the isocyanate-terminated polyurethane prepolymer and produces thixotropy in situ, in the polyurethane composition, such as, for example, alkyl diamines, ethylene polyamines, amine-terminated polyoxypropylenes, and amine-terminated polyoxyethylenes. Examples of aliphatic diamines include, for example, ethylene diamine, 1,6-hexanediamine, and 1,12-dodecanediamine. The aliphatic diamine can also be a cycloaliphatic diamine, such as, for example, 1,4-cyclohexane diamine, isophorone diamine, and the like. The useful diamines also include ethylene polyamines, such as, diethylene triamine, triethyl tetramine, xylene diamine, piperazine, and, preferably, amine-terminated polyoxypropylenes, such as, the Jeffamine series of compounds (available from Huntsman, Inc.). The amine or mixture of amines is present in the curative agent in amounts ranging from about 0.1 weight percent to about 1.5 weight percent of the total weight of the curative agent. A more preferred range is from about 0.2 to about 0.7 weight percent.

The thixotropic colloidal additive can be any thixotropic colloidal material that does not have a deleterious effect on the polyurethane composition or on the composition's use as a coating material. Useful thixotropic colloidal additives can include, for example, fumed silicas, clays, bentonites, talcs, and the like. Clays are usually hydrated aluminum silicates. Bentonite is a type of colloidal clay that is composed chiefly of montmorillonite. Talcs are hydrous magnesium silicates, which are also referred to as steatites or soapstone. Silica is a common name for silicondioxide, $SiO_2$, which occurs in nature as sand, quartz, flint, and diatomite. A preferred thixotropic colloidal additive is a fumed silica sold under the trademark AEROSIL (Degussa, Inc.).

The thixotropic colloidal additive can be present in the curative agent in an amount of from about 1.0 weight percent to about 10 weight percent, based on the total weight of the curative agent. A more preferred range is from about 2 to about 5 weight percent.

This combination of a thixotropic amine and a thixotropic colloidal additive in a polyurethane composition is a synergistic one that results in a polyurethane composition that flows effectively and resists undesirable dripping when the composition is used for rotational casting.

Preferably, the isocyanate-terminated polyurethane prepolymer can be mixed with the curative agent in amounts such that the total active hydrogen content of the curative agent is equal to about 80 to about 115 percent of the total isocyanate content of the isocyanate-terminated polyurethane prepolymer.

This polyurethane composition can be reacted, mixed, and applied at ambient temperatures in rotational casting where it results in minimal dripping and ridging of the coating on the rolls covered.

Rotational casting is the preferred method for depositing dissimilar compositions onto a cylindrical surface in accordance with the practice of the present invention. Rotational casting, per se, is well-known to those skilled in the art and, thus, will not be described in detail here. A useful discussion of the procedure may be found, for example in Ruprecht et al., *Polyurethane World Congress* 1991 (Sep. 24–26, 1991) 478–81. Those skilled in the art will also be aware that other equivalent depositing means are also known, such as, for example, spraying a hot curing polyurethane system onto a rotating roll core. See, for example, U.S. Pat. No. 4,571,798, especially FIG. 6. In this procedure, a cover is formed by spray coating directly onto a metal roll, a solventless two component urethane resin formulation composed of an isocyanate terminated prepolymer cured with a polyol and a catalyst. The resin components are mixed immediately prior to being fed to a spray gun and are maintained under pressure to feed the gun. The formulation quickly jells on the rolls so that no molds or curing ovens are needed.

In one possible arrangement, a steel roll has its journals mounted in bearings, and is rotated at a selected rate. A spray gun deposits the resin on the rotating roll at a selected rate. The speed of rotation of the roll and the rate of longitudinal advancement of the spray gun are correlated to provide a coat of a predetermined desired depth. Successive coatings are applied to build up a cover of the desired thickness with the underlying coat quickly jelling to accept another layer of the resin.

The cover may vary greatly in thickness depending upon its anticipated use conditions. Thicknesses of 0.1 to 2 inches are generally useful. For example, if it is desired to build up a coating one-half inch thick, the spray pattern can be adjusted to a 20 degree width, the longitudinal traverse of the spray head would be set at a two-inch lead and this would result in a thickness of 0.05 inch per layer with a ten-layer application producing the ½ inch thickness. This procedure results in a coating that is completely homogeneous throughout its thickness since the successive layers are applied before the underlying layer has set. Setting or full curing of the coating takes about two to seven days. After curing, the coating is ground to a desired diameter and finish.

As stated above either this method or, preferably, rotational casting could be used as the depositing means employed in the process of the present invention. However, according to the present invention, two dissimilar components are deposited onto the cylindrical surface sequentially. Thus, it will be necessary to have separate means for supplying each of the components to a common mixing device. One way this can be done is by putting a supply of component A into a vessel A and a supply of component B into a vessel B. Vessel A and vessel B will be situated so as to be capable of delivering their contents to a mixing head in controllable amounts from which component A and/or component B will be deposited on the cylindrical surface of a workpiece. Where component A is a material such as a polyurethane, which, in turn, is prepared by the combining of two or more components, e.g., A' and A", shortly before use, one will normally use additional separate vessels, e.g., vessel A' and vessel A", to supply the components to vessel A, preferably via appropriate valves and lines, so that their combining in vessel A can be controlled as may be required. It will normally be advantageous for vessel A under these circumstances to be provided with mixing means to ensure the contact between component A' and component A" required to initiate the reaction to form component A, which will then be delivered to the mixing head. The residence time of the components in vessel A and the mixing head will necessarily be brief—the actual length of time permitted being determined by the reactivity of the individual reactants chosen—in order to prevent excessive cross-linking prior to deposit on the cylindrical surface of the workpiece. Alternatively, as those skilled in the art will appreciate, components A' and A" could each be channeled directly to the mixing head via flow controlling means so that their interreaction to form component A can be initiated there, rather than by being routed through the intervening vessel A, as described above.

It is next contemplated that component A will continue to be deposited on the cylindrical surface of the workpiece until a predetermined coating thickness comprising component A, in the absence of component B, will have been applied. Once this occurs, addition of component B to the mixing head will commence, contemporaneous with the continued addition of component A. At this stage, the rate of addition of component A may or may not decrease—it is preferred that it decrease—but, in any event, will be considerably greater that the rate of addition of component B.

Where component B is a material such as a polyurethane, which, in turn, is prepared by the combining of two or more components, e.g., B' and B", shortly before use, one will normally use additional separate vessels, e.g., vessel B' and vessel B", to supply the components to vessel B, preferably via appropriate valves and lines, so that their combining in vessel B can be controlled as may be required. It will normally be advantageous for vessel B under these circumstances to be provided with mixing means to ensure the contact between component B' and component B" required to initiate the reaction to form component B, which will then be delivered to the mixing head. The residence time of the components in vessel B and the mixing head will necessarily be brief—the actual length of time permitted being determined by the reactivity of the individual reactants chosen—in order to prevent excessive cross-linking prior to deposit on the cylindrical surface of the workpiece. Alternatively, as those skilled in the art will appreciate, components B' and B" could each be channeled directly to the mixing head via flow controlling means so that their interreaction to form component B can be initiated there, rather than by being routed through the intervening vessel B, as described above.

It will be understood by those skilled in the art, that where component A and component B are both polyurethanes, they will be dissimilar polyurethanes, as required in the practice of the present invention. This dissimilarity may lie in, for example, the chemical structure of the polymeric chains, their molecular weight, their degree of branching, or in other chemical and/or physical characteristics known to those skilled in the art.

If not done when the flow of B is initiated, it will eventually be necessary to retard the rate of component A flow, since the end result must include a period during which the deposited component comprises B, exclusive of A. Although it is within the scope of the present invention to decrease the flow of A and increase the flow of B continually in small step-wise increments, which may, if desired, be done manually, it is preferred to approach continuous change in the flow of the two components, which will serve to smooth out the concentration gradient lying between component A and component B. This is conveniently and preferably done by means of valves, the gradual opening and closing of which are controlled by electronic computing means.

As the process continues, a time will come when the flow controlling means from vessel A will completely shut off the flow of the component A, resulting in the deposit of a coating on the outer surface comprising B in the absence of A. It is, of course, possible to continue adding additional layers to the cylindrical surface of the workpiece, if desired, by reversing the above-described process so that the ratio of A to B again increases, culminating in a second layer of A lying outside the layer of B, or by incorporating a new dissimilar component C, wherein the intervening gradient layer will run from component B containing no component C to component C containing no component B, and so on for still further components, if desired.

Thus, by virtue of the present invention a cylindrical surface can be coated with two or more layers of dissimilar materials having no interfaces between them, thereby overcoming, or at least substantially reducing, problems of adhesion between the successive layers.

In view of the many changes and modifications that can be made without departing from principles underlying the invention, reference should be made to appended claims for an understanding of the scope of the protection to be afforded the invention.

What is claimed is:

1. A method for depositing a polyurethane first component and at least one second component having a dissimilar composition from said polyurethane first component on a cylindrical surface comprising the steps of:

(a) rotating the cylindrical surface about its axis;

(b) locating a mixing head a predetermined distance from the cylindrical surface, said mixing head being connected to separate supply means for each of said components via flow controlling means;

(c) opening a first flow controlling means thereby supplying the polyurethane first component to the mixing head;

(d) repeatedly moving the mixing head in the axial direction along the rotating cylindrical surface while depositing the polyurethane first component from the mixing head onto the cylindrical surface;

(e) opening a second flow controlling means to the extent necessary to supply a second component having a dissimilar composition from said polyurethane first component to the mixing head at a flow rate lower than that at which the polyurethane first component is supplied;

(f) decreasing the flow rate of the polyurethane first component while increasing the flow rate of the second component until the flow of the polyurethane first component is terminated and a predetermined quantity of the second component has been deposited on the cylindrical surface;

whereby the cylindrical surface is coated with layers of the polyurethane first component and the second component and, between them, a gradient of the two components running from the cylindrical surface to the outer surface of the coatings and no interface.

2. The method of claim 1 wherein the second component is a polyurethane.

3. The method of claim 1 wherein the second component is a polyurethane.

4. The method of claim 1 wherein the polyurethane comprises:

(a) an isocyanate-terminated polyurethane prepolymer; and (b) a curative agent comprising (i) a polyol; (ii) an aromatic diamine; (iii) a thixotropic amine; and (iv) a thixotropic colloidal additive.

5. The method of claim 2 wherein the polyurethane comprises:

(a) an isocyanate-terminated polyurethane prepolymer; and (b) a curative agent comprising (i) a polyol; (ii) an aromatic diamine; (iii) a thixotropic amine; and (iv) a thixotropic colloidal additive.

6. The method of claim 3 wherein the polyurethane comprises:

(a) an isocyanate-terminated polyurethane prepolymer; and (b) a curative agent comprising (i) a polyol; (ii) an aromatic diamine; (iii) a thixotropic amine; and (iv) a thixotropic colloidal additive.

7. The method of claim 4 wherein the isocyanate-terminated polyurethane prepolymer is a reaction product of a polyol and an organic diisocyanate monomer selected from the group consisting of 2,4-toluene diisocyanate, 2,6-toluene diisocyanate, mixtures of the two isomers (TDI), 4,4'-diisocyanato diphenylmethane (MDI), p-phenylene diisocyanate (PPDI), naphthalene-1,5-diisocyanate, diphenyl-4,4'-diisocyanate, dibenzyl-4,4'-diisocyanate, stilbene-4,4'-diisocyanate, benzophenone-4,4'-diisocyanate, 1,3-xylene diisocyanate, 1,4-xylene diisocyanate, 1,6-hexamethylene diisocyanate, 1,3-cyclohexyl diisocyanate, 1,4-cyclohexyl diisocyanate (CHDI), diphenylmethane diisocyanate (H(12) MDI), and isophorone diisocyanate (IPDI).

8. The method of claim 5 wherein the isocyanate-terminated polyurethane prepolymer is a reaction product of a polyol and an organic diisocyanate monomer selected from the group consisting of 2,4-toluene diisocyanate, 2,6-toluene diisocyanate, mixtures of the two isomers (TDI), 4,4'-diisocyanato diphenylmethane (MDI), p-phenylene diisocyanate (PPDI), naphthalene-1,5-diisocyanate, diphenyl-4,4'-diisocyanate, dibenzyl-4,4'-diisocyanate, stilbene-4,4'-diisocyanate, benzophenone-4,4'-diisocyanate, 1,3-xylene diisocyanate, 1,4-xylene diisocyanate, 1,6-hexamethylene diisocyanate, 1,3-cyclohexyl diisocyanate, 1,4-cyclohexyl diisocyanate (CHDI), diphenylmethane diisocyanate (H(12) MDI), and isophorone diisocyanate (IPDI).

9. The method of claim 6 wherein the isocyanate-terminated polyurethane prepolymer is a reaction product of a polyol and an organic diisocyanate monomer selected from the group consisting of 2,4-toluene diisocyanate, 2,6-toluene diisocyanate, mixtures of the two isomers (TDI), 4,4'-diisocyanato diphenylmethane (MDI), p-phenylene diisocyanate (PPDI), naphthalene-1,5-diisocyanate, diphenyl-4,4'-diisocyanate, dibenzyl-4,4'-diisocyanate, stilbene-4,4'-diisocyanate, benzophenone-4,4'-diisocyanate, 1,3-xylene diisocyanate, 1,4-xylene diisocyanate, 1,6-hexamethylene diisocyanate, 1,3-cyclohexyl diisocyanate, 1,4-cyclohexyl diisocyanate (CHDI), diphenylmethane diisocyanate (H(12) MDI), and isophorone diisocyanate (IPDI).

10. The method of claim 7 wherein the isocyanate-terminated polyurethane monomer is selected from the group consisting of CHDI, MDI, TDI, and PPDI.

11. The method of claim 8 wherein the isocyanate-terminated polyurethane monomer is selected from the group consisting of CHDI, MDI, TDI, and PPDI.

12. The method of claim 9 wherein the isocyanate-terminated polyurethane monomer is selected from the group consisting of CHDI, MDI, TDI, and PPDI.

13. The method of claim 4 wherein the isocyanate-terminated polyurethane prepolymer is a reaction product of an organic diisocyanate monomer and a polyol selected from the group consisting of ethylene glycol, diethylene glycol, dipropylene glycol, neopentyl glycol, 1,3-butanediol, 1,4-butanediol, polytetramethylene ether glycol (PTMEG), polypropylene glycol, polyethylene butylene diol, and a dihydroxypolyester.

14. The method of claim 5 wherein the isocyanate-terminated polyurethane prepolymer is a reaction product of an organic diisocyanate monomer and a polyol selected from the group consisting of ethylene glycol, diethylene glycol, dipropylene glycol, neopentyl glycol, 1,3-butanediol, 1,4-butanediol, polytetramethylene ether glycol (PTMEG), polypropylene glycol, polyethylene butylene diol, and a dihydroxypolyester.

15. The method of claim 6 wherein the isocyanate-terminated polyurethane prepolymer is a reaction product of an organic diisocyanate monomer and a polyol selected from the group consisting of ethylene glycol, diethylene glycol, dipropylene glycol, neopentyl glycol, 1,3-butanediol, 1,4-butanediol, polytetramethylene ether glycol (PTMEG), polypropylene glycol, polyethylene butylene diol, and a dihydroxypolyester.

16. The method of claim 13 wherein the isocyanate-terminated polyurethane prepolymer is a reaction product of an organic diisocyanate monomer and PTMEG.

17. The method of claim 14 wherein the isocyanate-terminated polyurethane prepolymer is a reaction product of an organic diisocyanate monomer and PTMEG.

18. The method of claim 15 wherein the isocyanate-terminated polyurethane prepolymer is a reaction product of an organic diisocyanate monomer and PTMEG.

19. The method of claim 4 wherein the curative agent comprises a polyol selected from the group consisting of ethylene glycol, diethylene glycol, dipropylene glycol, neopentyl glycol, 1,3-butanediol, 1,4-butanediol, polytetramethylene ether glycol (PTMEG), polypropylene glycol, polyethylene butylene diol, and a dihydroxypolyester.

20. The method of claim 5 wherein the curative agent comprises a polyol selected from the group consisting of ethylene glycol, diethylene glycol, dipropylene glycol, neopentyl glycol, 1,3-butanediol, 1,4-butanediol, polytetramethylene ether glycol (PTMEG), polypropylene glycol, polyethylene butylene diol, and a dihydroxypolyester.

21. The method of claim 6 wherein the curative agent comprises a polyol selected from the group consisting of ethylene glycol, diethylene glycol, dipropylene glycol, neopentyl glycol, 1,3-butanediol, 1,4-butanediol, polytetramethylene ether glycol (PTMEG), polypropylene glycol, polyethylene butylene diol, and a dihydroxypolyester.

22. The method of claim 4 wherein the curative agent comprises an aromatic amine selected from the group consisting of 4,4'-methylene-bis-(3-chloro)aniline (MBCA), 4,4'-methylene-bis-(3-chloro-2,6-diethyl)aniline (MCDEA), diethyl toluene diamine (DETDA), t-butyl toluene diamine (TBTDA), dimethylthio-toluene diamine, trimethylene glycol di-p-aminobenzoate, 1,2-bis(2-aminophenylthio)ethane, 4,4'-methylene-bis-(2-chloroaniline), 2,2',5-trichloro-4,4'-methylene diamine, naphthalene-1,5-diamine, ortho, meta, and para-phenylene diamines, toluene-2,4-diamine, dichlorobenzidine, diphenylether-4,4'-diamine, and mixtures thereof.

23. The method of claim 5 wherein the curative agent comprises an aromatic amine selected from the group consisting of 4,4'-methylene-bis-(3-chloro)aniline (MBCA), 4,4'-methylene-bis-(3-chloro-2,6-diethyl)aniline (MCDEA), diethyl toluene diamine (DETDA), t-butyl toluene diamine (TBTDA), dimethylthio-toluene diamine, trimethylene glycol di-p-aminobenzoate, 1,2-bis(2-aminophenylthio)ethane, 4,4'-methylene-bis-(2-chloroaniline), 2,2',5-trichloro-4,4'-methylene diamine, naphthalene-1,5-diamine, ortho, meta, and para-phenylene diamines, toluene-2,4-diamine, dichlorobenzidine, diphenylether-4,4'-diamine, and mixtures thereof.

24. The method of claim 6 wherein the curative agent comprises an aromatic amine selected from the group consisting of 4,4'-methylene-bis-(3-chloro)aniline (MBCA), 4,4'-methylene-bis-(3-chloro-2,6-diethyl)aniline (MCDEA), diethyl toluene diamine (DETDA), t-butyl toluene diamine (TBTDA), dimethylthio-toluene diamine, trimethylene glycol di-p-aminobenzoate, 1,2-bis(2-aminophenylthio)ethane, 4,4'-methylene-bis-(2-chloroaniline), 2,2',5-trichloro-4,4'-methylene diamine, naphthalene-1,5-diamine, ortho, meta, and para-phenylene diamines, toluene-2,4-diamine, dichlorobenzidine, diphenylether-4,4'-diamine, and mixtures thereof.

25. The method of claim 4 wherein the curative agent comprises a thixotropic amine selected from the group consisting of ethylene diamine, 1,6-hexanediamine, 1,12-dodecanediamine, 1,4-cyclohexane diamine, isophorone diamine, diethylene triamine, triethyl tetramine, amine-terminated polyoxypropylenes, xylene diamine, and piperazine.

26. The method of claim 5 wherein the curative agent comprises a thixotropic amine selected from the group consisting of ethylene diamine, 1,6-hexanediamine, 1,12-dodecanediamine, 1,4-cyclohexane diamine, isophorone diamine, diethylene triamine, triethyl tetramine, amine-terminated polyoxypropylenes, xylene diamine, and piperazine.

27. The method of claim 6 wherein the curative agent comprises a thixotropic amineselected from the group consisting of ethylene diamine, 1,6-hexanediamine, 1,12-dodecanediamine, 1,4-cyclohexane diamine, isophorone diamine, diethylene triamine, triethyl tetramine, amine-terminated polyoxypropylenes, xylene diamine, and piperazine.

28. The method of claim 4 wherein the curative agent comprises a thixotropic colloidal additive selected from the group consisting of fumed silica, clay, bentonite, and talc.

29. The method of claim 5 wherein the curative agent comprises a thixotropic colloidal additive selected from the group consisting of fumed silica, clay, bentonite, and talc.

30. The method of claim 6 wherein the curative agent comprises a thixotropic colloidal additive selected from the group consisting of fumed silica, clay, bentonite, and talc.

\* \* \* \* \*